(12) United States Patent
Li (10) Patent No.: US 8,799,998 B2
(45) Date of Patent: Aug. 5, 2014

(54) METHODS FOR CONTROLLING A TRAFFIC OF AN AUTHENTICATION SERVER

(75) Inventor: Wei Li, Beijing (CN)

(73) Assignee: Hangzhou H3C Technologies Co., Ltd., Zhejiang (CN)

( * ) Notice: Subject to any disclaimer, the term of this patent is extended or adjusted under 35 U.S.C. 154(b) by 48 days.

(21) Appl. No.: 13/436,118

(22) Filed: Mar. 30, 2012

(65) Prior Publication Data

US 2012/0254943 A1 Oct. 4, 2012

(30) Foreign Application Priority Data

Mar. 31, 2011 (CN) .......................... 2011 1 0080256

(51) Int. Cl.
  *H04L 9/32* (2006.01)
  *G06F 21/00* (2013.01)
  *H04L 12/56* (2006.01)
  *H04L 29/06* (2006.01)

(52) U.S. Cl.
  CPC .............. *H04L 47/215* (2013.01); *H04L 63/08* (2013.01)
  USPC .................... 726/3; 709/245; 370/235; 726/6; 713/155

(58) Field of Classification Search
  None
  See application file for complete search history.

(56) References Cited

U.S. PATENT DOCUMENTS

| | | | |
|---|---|---|---|
| 6,901,050 B1 * | 5/2005 | Acharya .................... | 370/230.1 |
| 7,111,323 B1 | 9/2006 | Bhatia et al. | |
| 7,617,524 B2 * | 11/2009 | Haverinen et al. ................. | 726/6 |
| 7,738,382 B2 * | 6/2010 | Le Faucheur et al. ..... | 370/235.1 |
| 8,032,932 B2 | 10/2011 | Speyer et al. | |
| 8,315,168 B2 * | 11/2012 | Davari .......................... | 370/235 |
| 2004/0039844 A1 * | 2/2004 | Bonn ............................ | 709/245 |
| 2005/0015490 A1 | 1/2005 | Saare et al. | |
| 2010/0050251 A1 | 2/2010 | Speyer et al. | |

FOREIGN PATENT DOCUMENTS

| | | |
|---|---|---|
| CN | 1604528 | 4/2005 |
| CN | 101060471 | 10/2007 |
| CN | 101075971 | 11/2007 |
| CN | 101364936 | 2/2009 |
| CN | 101557348 | 10/2009 |

OTHER PUBLICATIONS

Tilo Boettcher et al., Unleash the Power of Single Sign-on with Microsoft and SAP, Collaboration Technology Support Center—Microsoft, Sep. 2007.
User Authentication:FortiOS™ Handbook v3 for FortiOS 4.0 MR3, FORTINET, Dec. 16, 2011.

(Continued)

*Primary Examiner* — Jung Kim
*Assistant Examiner* — Janusz Kusyk (57) ABSTRACT

A method for controlling the traffic of an authentication server and an authentication access apparatus, wherein a local area network token bucket including a high priority token bucket and a low priority token bucket is set according to the capability of the authentication server in processing the request message, and the request message sent by the authentication client is redirected to the authentication server after allocating a token to the authentication client, thus the traffic of the authentication server is controlled, so that the authentication server will not receive more request messages than it can handle. Meanwhile, the tokens in the high priority token bucket are reserved specially for authentication clients of a high priority, and they cannot be used by authentication clients that are not of a high priority, so the quality of service for authentication clients of a high priority is improved.

15 Claims, 5 Drawing Sheets

(56) References Cited

OTHER PUBLICATIONS

David Pham et al., An Intrusion Tolerance Approach to Enhance Single Sign on Server Protection, International Cyber Center and Department of Computer Science, George Mason University, Fairfax, Virginia SCIT Labs Inc, Virginia, Jul. 2010.
CN First Office Action dated Apr. 12, 2013 issued on CN Patent Application No. 201110080256.4 filed on Mar. 31, 2011, The State Intellectual Property Office, P.R. China.

* cited by examiner

METHODS FOR CONTROLLING A TRAFFIC OF AN AUTHENTICATION SERVER

CLAIM FOR PRIORITY

The present application claims priority under 35 U.S.C 119 to Chinese application number 201110080256.4, filed on Mar. 31, 2011, which is incorporated by reference in its entirety.

BACKGROUND

In order to enhance security control and operation management of network resources, it is necessary to control users' access to networks. For example, in network access points of some public places, residential areas or corporations, the access service providers may wish to allow access only by the paying users. Another example is that some enterprises may provide some internal key resources for access by some special users. The technique of authentication emerges in order to realize access controls mentioned above.

DETAILED DESCRIPTION

An authentication system usually includes an authentication client, an authentication server, an authentication access device and an Authentication Authorization Accounting (AAA) server. An authentication server may serve one or more local area networks, and one authentication access device may also serve one or more local area networks, while the specific relationships of an authentication server and local area networks as well as an authentication access device and local area networks may be set according to requirements of a specific application.

Now a method of authenticating a user will be described by taking the Portal authentication technique as an example.

The Portal authentication technique provides a flexible way of access control, which directly uses the WEB page for authentication without requiring additionally deployed clients.

Figure 1:
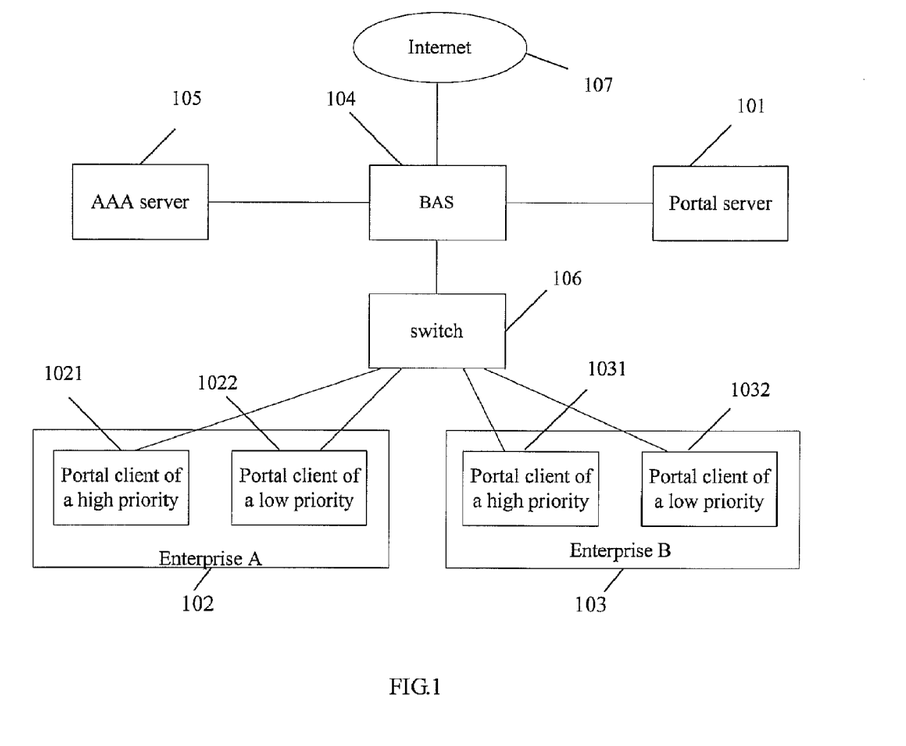
FIG. 1 is a schematic diagram of the Portal deployment of a district/office building according to an example.

It is supposed that a district or an office building is a local area network, and different enterprises in the district or office building are different sub local area networks in the local area network. FIG. 1 is a schematic diagram of the Portal deployment of a district/office building according to an example, which comprises: a Portal server 101, Portal clients 1021, 1022, 1031, 1032, a Broadband Access Server (BAS) 104 and an AAA server 105, wherein, the Portal server 101 is a service end system that accepts authentication requests in the Portal networking, the Portal client 1021 or 1022 provided in enterprise A 102 and the Portal client 1031 or 1032 provided in enterprise B 103 are client systems that initiate an authentication request in the Portal networking, which are actually browsers that run Hypertext Transfer Protocols (HTTPs) on users' terminal devices, and the BAS 104 is an authentication access device in the Portal networking.

The components shown in FIG. 1 perform the authentication operations as follows:

First, an un-authenticated Portal client 1021, 1022, 1031 or 1032 accesses a network 107 and sends a request message. The BAS 104, after parsing that the request message is sent by an un-authenticated Portal client 1021, 1022, 1031 or 1032, returns to the Portal client 1021, 1022, 1031 or 1032 the address of the Portal server 101. And then, the Portal client 1021, 1022, 1031 or 1032 re-sends the request message to the Portal server 101.

After the above-mentioned operations, the request message (i.e., HTTP request) of the Portal client 1021, 1022, 1031 or 1032 is redirected to the Portal server 101 through the BAS 104.

Subsequently, the Portal client 1021, 1022, 1031 or 1032 writes authentication information on a WEB authentication page provided by the Portal server 101 and submits it. The Portal server 101 then sends the authentication information to the BAS 104. The BAS 104 interacts with the AAA server 105 and authenticates, authorizes and bills the Portal client 1021, 1022, 1031 or 1032 using the authentication information.

After passing the authentication, the Portal client 1021, 1022, 1031 or 1032 sends a request message, and the BAS 104 allows the request message to pass. In another words, the BAS 104 opens the pathway between the Portal client 1021, 1022, 1031 or 1032 and the Internet 107 to allow access to the Internet 107 by the Portal client 1021, 1022, 1031 or 1032.

Since there are many authentication clients in the local area network, if the request messages of many authentication clients are redirected to the authentication server at the same time, a traffic attacking the authentication server will be formed, which will seriously affect the performance of the authentication server, as a result, some users of a high priority may not be able to be authenticated and access the Internet resources, and the quality of service for the users of a high priority is lowered.

Figure 2:
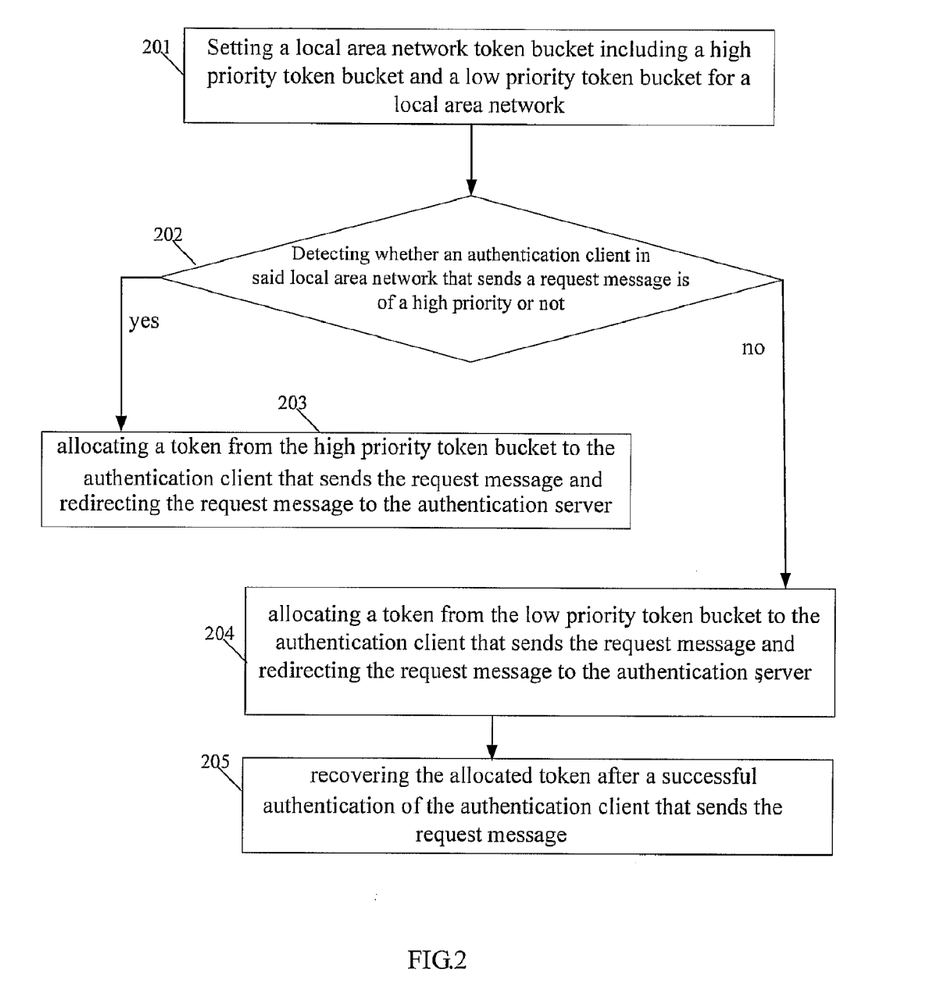
FIG. 2 is a flow chart of a method for controlling a traffic of an authentication sever according to an example.

FIG. 2 is a flow chart of the method for controlling the traffic of an authentication sever according to an example, the method comprises:

At block 201, setting a token bucket for storing tokens first, specifically, setting a local area network token bucket including a high priority token bucket and a low priority token bucket for a local area network. The local area network token bucket is to store tokens for allocating to authentication clients in the local area network. When one authentication server serves only one local area network, the number of tokens in the local area network token bucket corresponding to the local area network is equal to the number of request messages which can be processed by the authentication server. When one authentication server serves more than two local area networks, the number of tokens in the local area network token bucket corresponding to the local area network is less than the number of request messages which can be processed by the authentication server. The specific value of the number of tokens can be flexibly configured according to the demand of the local area network.

At block 202: detecting whether an authentication client in the local area network that sends a request message is of a high priority or not, proceeding to block 203 when the authentication client has been detected to be of a high priority, and proceeding to block 204 when the authentication client has been detected to be not of a high priority.

At block 203: allocating a token from the high priority token bucket to the authentication client that sends the request message and redirecting the request message to the authentication server, and then proceeding to block 205.

At block 204: allocating a token from the low priority token bucket to the authentication client that sends the request message and redirecting the request message to the authentication server, and then proceeding to block 205

At block 205: recovering the allocated token after a successful authentication of the authentication client that sends the request message.

In addition, in one example, the setting of a local area network token bucket (i.e., a token bucket) at block 201 may be performed only one time at the beginning. Of course, in another example, the setting of a local area network token bucket (i.e., a token bucket) at block 201 may be performed at any time according to the requirements of a particular application.

It can be seen that in the method for controlling the traffic of an authentication sever according to the example, a local area network token bucket including a high priority token bucket and a low priority token bucket is set according to the capability of the authentication server in processing the request messages, and the request message sent by the authentication client is redirected to the authentication server after allocating a token to the authentication client, thus the traffic of the authentication server is controlled, so that the authentication server will not receive more request messages than it can handle. Meanwhile, the tokens in the high priority token bucket are reserved exclusively for authentication clients of a high priority, and they cannot be used by authentication clients that are not of a high priority, so the quality of service for authentication clients of a high priority is improved.

It is noted that the above-mentioned method is performed only with respect to the un-authenticated authentication clients, while as for the authentication clients that have already been authenticated or that have been preset as not requiring authentication, the above-mentioned method will not be performed, but such authentication clients that have already been authenticated or that have been preset as not requiring authentication are directly allowed access to the Internet.

The method for controlling the traffic of an authentication server is described below according to an example.

Figure 3:
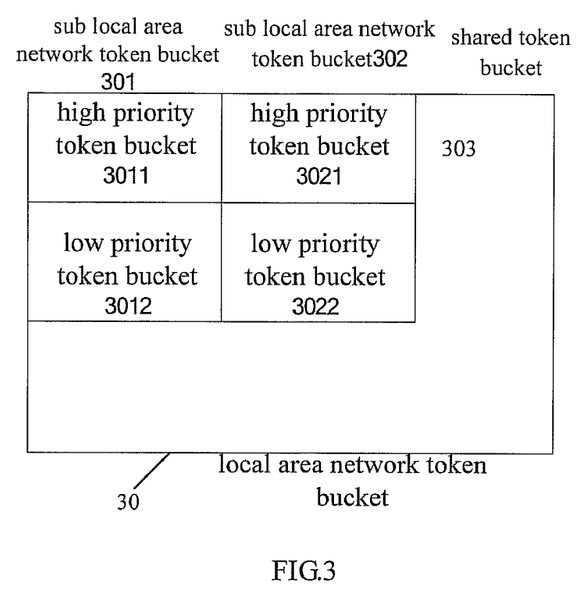
FIG. 3 is a schematic diagram of the setting of a token bucket according to an example.

FIG. 3 is a schematic diagram of the setting of a token bucket according to an example. In the example, the authentication system is a Portal authentication system, and the local area network includes two sub local area networks. The setting of the token bucket in this example includes:

first, setting a local area network token bucket 30, in which the number of tokens can be set flexibly, as long as it is not beyond the capability of the Portal server in processing request messages;

second, setting a shared token bucket 303 and sub local area network token buckets 301 and 302 corresponding to each of the sub local area networks in the local area network token bucket 30, the number of tokens in each of sub local area network token buckets 301 or 302 being customized according to the requests, and the sum of the numbers of tokens in each of the sub local area network token buckets 301 and 302 and in the shared token bucket 303 being equal to the number of tokens in the local area network token bucket 30;

third, setting a high priority token bucket 3011 or 3021 and a low priority token bucket 3012 or 3022 in each of the sub local area network token buckets 301 and 302, wherein the number of tokens in the high priority token bucket 3011 or 3021 is equal to the number of Portal clients (i.e., authentication clients) that are configured to have a high priority in the sub local area network to which the high priority token bucket 3011 or 3021 belongs, and the sum of the numbers of tokens in the high priority token bucket 3011 or 3021 and low priority token bucket 3012 or 3022 of a sub local area network token bucket are equal to the number of tokens in the sub local area network token bucket 301 or 302.

Figure 4:
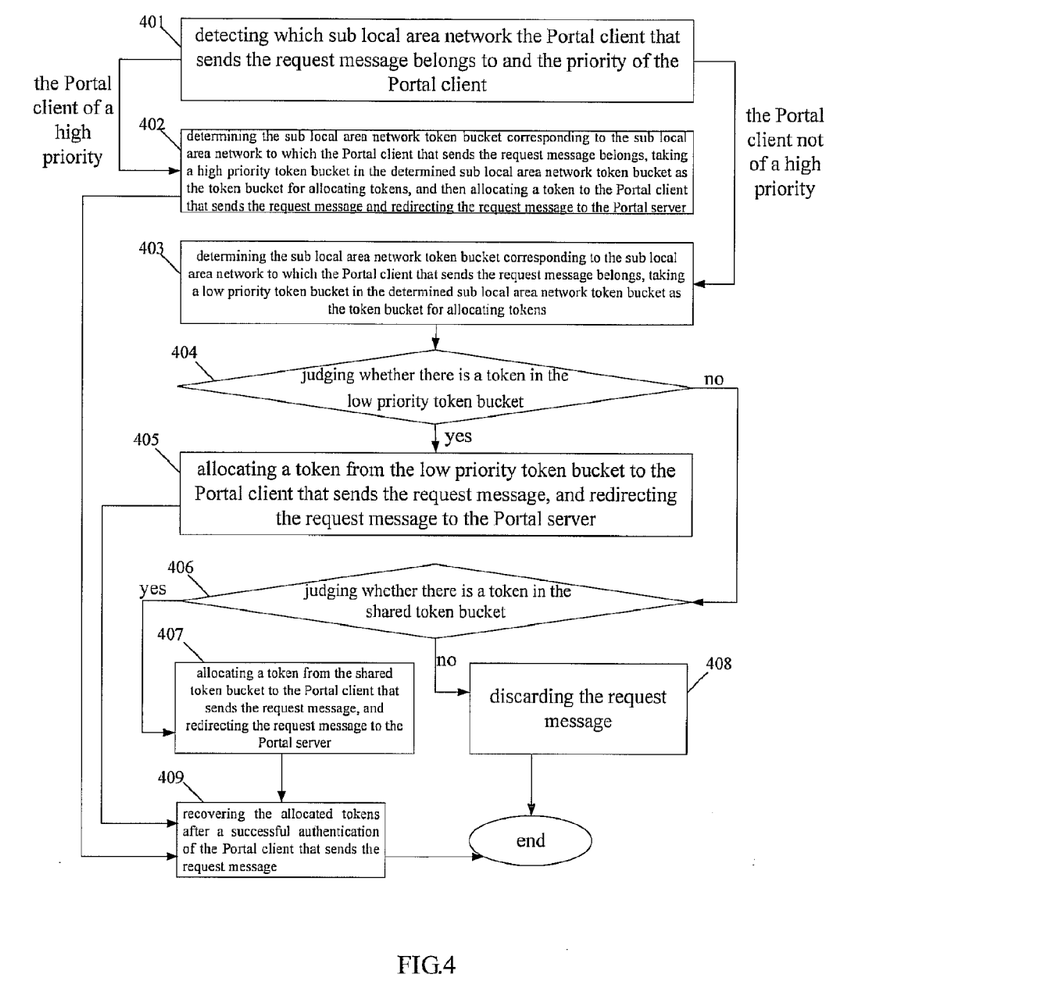
FIG. 4 is a flow chart of the method for controlling the Portal server traffic according to an example.

In the present example, the configuration of the Portal client of a high priority and the Portal client of a low priority includes the following two circumstances: for a three-layer Portal authentication, the Portal client is identified by an IP address, and an IP address field corresponding to each of the sub local area networks as well as the corresponding priority of each IP address in each IP address field are configured; and for a two-layer Portal authentication, the Portal client is identified by a Media Access Control (MAC) address, and a corresponding MAC address field of each of the sub local area networks as well as the corresponding priority of each MAC address in each MAC address field are pre-configured;

FIG. 4 is a flow chart of the method for controlling the Portal server traffic according to an example, the method includes as follows:

at block 401: detecting which sub local area network the Portal client that sends the request message belongs to and the priority of the Portal client, proceeding to block 402 if the Portal client is detected to be of a high priority, and proceeding to block 403 if the Portal client is detected to be not of a high priority.

At block 401, the detection process is as follows: if it is a three-layer Portal authentication, the sub local area network to which the Portal client belongs and the priority of the Portal client are determined according to the IP address and configuration information of the Portal client that sends the request message; if it is a two-layer Portal authentication, the sub local area network to which the Portal client belongs and the priority of the Portal client are determined according to the MAC address and configuration information of the Portal client that sends the request message.

At block 402: determining the sub local area network token bucket 301 or 302 corresponding to the sub local area network to which the Portal client that sends the request message belongs, and taking a high priority token bucket 3011 or 3021 in the determined sub local area network token bucket 301 or 302 as the token bucket for allocating tokens, and then allocating a token to the Portal client that sends the request message and redirecting the request message to the Portal server, and then proceeding to block 409.

At block 402, the number of tokens in each high priority token bucket 3011 or 3021 is equal to the number of Portal clients that are configured to have a high priority in its sub local area network, so the Portal clients of a high priority will have tokens allocated thereto in any case.

At block 403, determining the sub local area network token bucket 301 or 302 corresponding to the sub local area network to which the Portal client that sends the request message belongs, and taking a low priority token bucket 3012 or 3022 in the determined sub local area network token bucket 301 or 302 as the token bucket for allocating tokens.

At block 404, judging whether there is a token in the low priority token bucket 3012 or 3022, if yes, then proceeding to block 405, otherwise, proceeding to block 406.

At block 405, allocating a token from the low priority token bucket 3012 or 3022 to the Portal client that sends the request message and redirecting the request message to the Portal server, and then proceeding to block 409.

At block 406: judging whether there is a token in the shared token bucket 303, if yes, then proceeding to block 407, otherwise, proceeding to block 408.

At block 407, allocating a token from the shared token bucket 303 to the Portal client that sends the request message and redirecting the request message to the Portal server, and then proceeding to block 409.

At block 408, discarding the request message and ending the method.

At block 409, recovering the allocated tokens after a successful authentication of the Portal client that sends the request message, and the method ends.

The recovering of the allocated token at block 409 specifically includes: re-generating a token in the token bucket allocating the token to the Portal client that sends the request message.

The process shown in FIG. 4 can be implemented in various specific application scenarios, for example, a district or an office building is considered as a local area network, and the enterprises in the district or office building are considered as different sub local area networks. Each of the enterprises may request to customize its own sub local area network token bucket as well as the high priority token buckets and low priority token bucket in the sub local area network token bucket according to the requirements of an application.

In addition to controlling the traffic of the Portal server and guaranteeing the quality of service for users of a high priority, the following further technical effects are also achieved by the process shown in FIG. 4:

1. The sub local area network token buckets are further provided in the local area network token bucket, which are independent from each other and include high priority token buckets and low priority token buckets, so that each of the sub local area networks can conveniently change the setting of the corresponding sub local area network token bucket according to the change of its own requirements without the need to request customization to the local area network administrator, for example, if the number of Portal clients that are configured to have a high priority is increased in an enterprise, then the number of tokens in the high priority token buckets of the enterprise can be increased by the administrator of the enterprise and the number of tokens in the low priority token buckets of the enterprise can be reduced by the administrator of the enterprise correspondingly;

2. Not only sub local area network token buckets but also independent shared token buckets are provided in the local area network token bucket, and since the tokens in the shared token bucket can be allocated to Portal clients that are not of a high priority in all sub local area networks, the utility rate of the Portal server resource is increased;

3. In each sub local area network token bucket, the number of tokens in the provided high priority token buckets is equal to the number of the Portal clients that are configured to have a high priority in the sub local area network, thus it is ensured that the Portal clients of a high priority can have tokens allocated thereto in any case, which further guarantees the quality of service for Portal clients of a high priority.

The above example is just an example of the method for controlling the traffic of an authentication server, but in other application scenarios, there may also be the following circumstances:

First, one high priority token bucket and more than two low priority token buckets are provided in each local area network token bucket, accordingly, the Portal clients can be configured to have a high priority or low priorities of different levels. On this basis, the process of implementation of the method is basically the same as the process shown in FIG. 4, and the differences lie in that:

At block 403, further searching the determined sub local area network for the low priority token bucket corresponding to the level of the Portal client that sends the request message, and taking the found low priority token bucket as the token bucket for allocating tokens are performed;

At block 406, first judging, in the sub local area network token bucket corresponding to the sub local area network to which the Portal client that sends the request message belongs, whether there is a token in other low priority token buckets whose level is lower than that of the low priority token bucket found in block 403, if yes, then allocating a token from the other low priority token buckets to the Portal client that sends the request message and redirecting the request message to the Portal server, otherwise, performing again the judging whether there is a token in the shared token bucket.

Second, no shared token bucket is provided in the local area network token bucket, while one high priority token bucket and more than two low priority token buckets are provided in each local area network token bucket, accordingly, the Portal clients can be configured to have a high priority or low priorities of different levels. On this basis, the process of implementation of the method is basically the same as the process shown in FIG. 4, and the differences lie in that:

At block 403, further searching the determined sub local area network for the low priority token bucket corresponding to the level of the Portal client that sends the request message, and taking the found low priority token bucket as the token bucket for allocating tokens are performed;

Not performing block 406, and when it is determined at block 404 that the low priority token bucket found at block 403 does not have any tokens, and then further judging, in the sub local area network token bucket corresponding to the sub local area network to which the Portal client that sends the request message belongs, whether there is a token in other low priority token buckets whose level is lower than that of the low priority token bucket found in block 403, if yes, then allocating a token from the other low priority token buckets to the Portal client that sends the request message and redirecting the request message to the Portal server, otherwise, performing block 408 directly.

It can be seen that when providing more than two low priority token buckets in each of the sub local area network token buckets, it is allowed to preempt tokens for Portal clients corresponding to low priority token buckets of a certain level from low priority token buckets of a lower level in the same sub local area network token bucket.

Further, if it is necessary to make sure that not all the tokens in the low priority token buckets of a lower level are preempted, a token preempting threshold may be set, when the number of tokens preempted in a low priority token bucket has reached the token preempting threshold, it will not be allowed to preempt tokens from the low priority token bucket.

In addition, in some application scenarios, if several Portal clients configured to have a high priority cannot possibly need to be authenticated simultaneously, for example, some high priority users and other high priority users in an enterprise use the network resources at completely different times, the number of tokens in the high priority token buckets may be set to be less than the number of Portal clients of a high priority, thus the Portal clients of a high priority that need to be authenticated at the same time can always have tokens allocated thereto, thereby avoiding the waste caused by reserving too many tokens for the Portal clients of a high priority.

Figure 5:
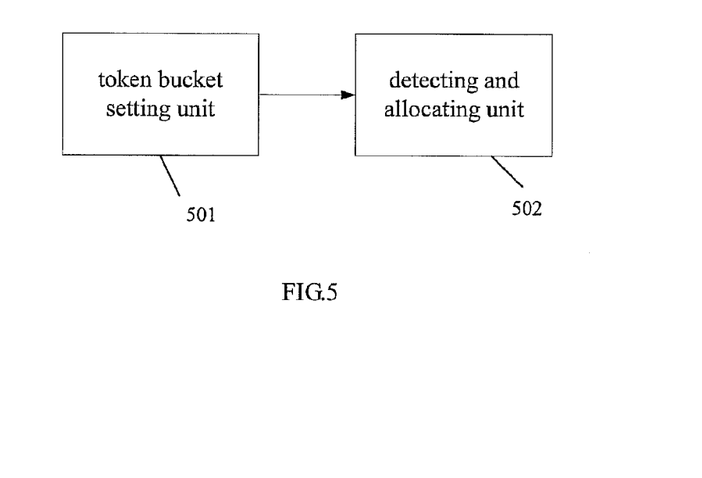
FIG. 5 is a structural schematic diagram of the authentication access apparatus according to an example.

FIG. 5 is a structural schematic diagram of an authentication access apparatus according to an example, the authentication access apparatus comprises: a token bucket setting unit 501 and a detecting and allocating unit 502.

The token bucket setting unit 501 is to set a local area network token bucket including a high priority token bucket and a low priority token bucket for a local area network, wherein the number of tokens in the local area network token bucket is equal to the number of request messages which can be processed by an authentication server.

The detecting and allocating unit 502 is to detect whether an authentication client that sends a request message is of a high priority or not, when the authentication client has been detected to be of a high priority, to allocate a token from the high priority token bucket to the authentication client that sends the request message and redirect the request message to the authentication server; and when the authentication client has been detected to be not of a high priority, to allocate a token from the low priority token bucket to the authentication client that sends the request message and redirect the request message to the authentication server; and to recover the allocated token after the successful authentication of the authentication client that sends the request message.

It can be seen that in the authentication access apparatus according to the above-mentioned example, the local area network token bucket including a high priority token bucket and a low priority token bucket is set according to the capability of the authentication server in processing the request messages, and the request message sent by the authentication client is redirected to the authentication server after allocating a token to the authentication client, thus the traffic of the authentication server is controlled, so that the authentication server will not receive more request messages than it can handle. Meanwhile, the tokens in the high priority token bucket are reserved exclusively for authentication clients of a high priority, and they cannot be used by authentication clients that are not of a high priority, so the quality of service for authentication clients of a high priority is improved.

Figure 6:
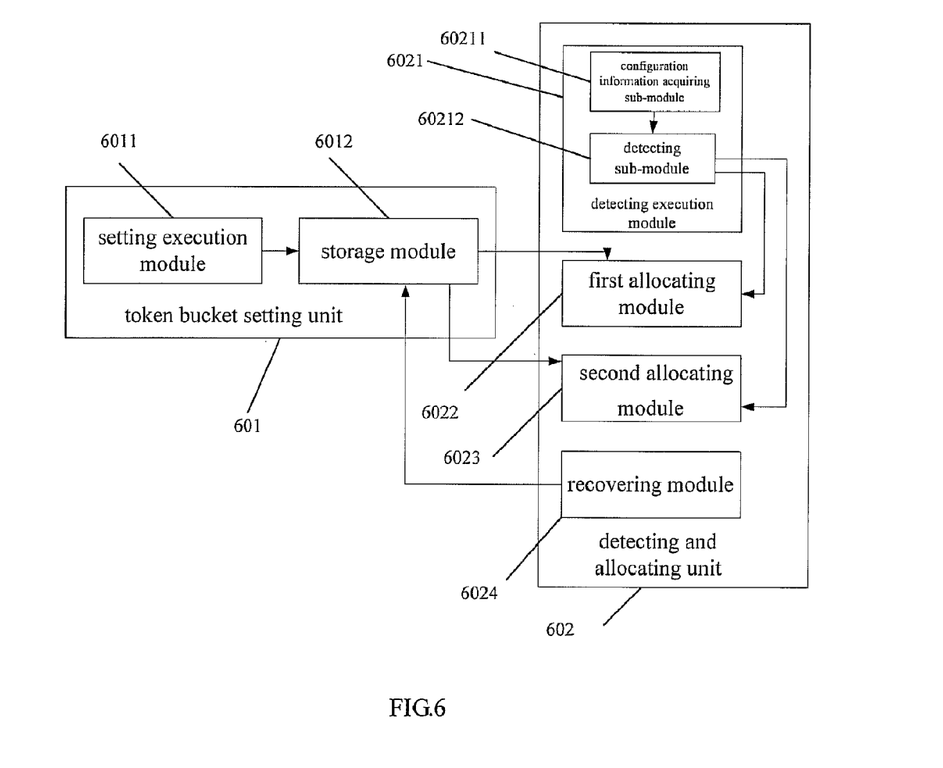
FIG. 6 is a structural schematic diagram of the authentication access apparatus according an example.

FIG. 6 is a structural schematic diagram of the authentication access apparatus according to an example. In this example, the authentication system is a Portal authentication system, and the local area network includes more than two sub local area networks.

As shown in FIG. 6, the token bucket setting unit 601 comprises: a setting execution module 6011 and a storage module 6012.

The setting execution module 6011 is to set a local area network token bucket, the number of tokens in the local area network token bucket being equal to the number of request messages which can be processed by the authentication server; to set sub local area network token buckets corresponding to each of the sub local area networks in the local area network token bucket and a shared token bucket, a sum of the numbers of tokens in each of the sub local area network token buckets and in the shared token bucket being equal to the number of tokens in the local area network token bucket; to set a high priority token bucket and a low priority token bucket in each sub local area network token bucket, wherein the number of tokens in the high priority token bucket is equal to the number of authentication clients which are of a high priority in the sub local area network and the sum of the numbers of tokens in the high priority token bucket and low priority token bucket is equal to the number of tokens in the sub local area network token bucket.

The storage module 6012 is to store the result of setting of the setting execution module 6011.

As shown in FIG. 6, the detecting and allocating unit 602 comprises: a detecting execution module 6021, a first allocating module 6022, a second allocating module 6023 and a recovering module 6024.

The detecting execution module 6021 is to detect which sub local area network the authentication client that sends the request message belongs to and the priority of the authentication client.

The first allocating module 6022 is to, when the detecting execution module 6021 has detected that the Portal client is of a high priority, determine a sub local area network token bucket corresponding to the sub local area network to which the Portal client that sends the request message belongs, and to take the high priority token bucket in the determined sub local area network token bucket as a token bucket for allocating tokens, and then to allocate a token to the Portal client that sends the request message and to redirect the request message to the Portal server.

The second allocating module 6023 is to, when the detecting execution module 6021 has detected that the Portal client is not of a high priority, determine a sub local area network token bucket corresponding to the sub local area network to which the Portal client that sends the request message belongs, and take the low priority token bucket in the determined sub local area network token bucket as a token bucket for allocating tokens, and to allocate a token to the Portal client that sends the request message and redirect the request message to the Portal server; and if there is no token in the token bucket for allocating tokens, to allocate further a token in the shared token bucket to the Portal client that sends the request message and redirect the request to the Portal server, and to discard the request message if there is no token in the shared token bucket for allocating tokens.

The recovering module 6024 is to recover the allocated token after a successful authentication of the Portal client that sends the request message.

Furthermore, the detecting execution module 6021 comprises a configuration information acquiring sub-module 60211 and a detecting sub-module 60212.

The configuration information acquiring sub-module 60211 is to provide the configuration information of the authentication client of a high priority and the authentication client of a low priority to the detecting sub-module 60212. The configuration information comprises: an IP address network field corresponding to each of the sub local area networks and the corresponding priority of each IP address in each IP address network field when the authentication client is identified with an IP address; and a corresponding MAC address network field of each of the sub local area networks and the corresponding priority of each MAC address in each MAC address network segment when the authentication client is identified with an MAC address.

The detecting sub-module 60212 is to determine which sub local area network a Portal client that sends the request message belongs to and the corresponding priority of the Portal client according to the IP address and configuration information of the Portal client; or, to determine the sub local area network to which a Portal client that sends the request message belongs and the corresponding priority of the Portal client according to the MAC address and configuration information of the Portal client.

The above-mentioned example is only an example of the authentication access apparatus, while in other application scenarios, there may be the following circumstances.

First, the setting execution module 6011 shown in FIG. 6 can set one high priority token bucket and two low priority token buckets in each sub local area network token bucket. On this basis, the second allocating module 6023 shown in FIG. 6 is to determine the sub local area network token bucket corresponding to the sub local area network to which the Portal client that sends the request message belongs when the detecting execution module 6011 detects that the Portal client is not of a high priority, and to search the determined sub local area network token bucket for a low priority token bucket which corresponds to the level of the authentication client that sends the request message and to take the found low priority token bucket as the token bucket for allocating tokens, and then to allocate a token to the Portal client that sends the request message and redirect the request message to the Portal server; if there is no token in the token bucket for allocating tokens, then first further judging whether there is a token in other low priority token buckets whose level is lower than that of the found low priority token bucket, if yes, then to preempt one token from the other low priority token buckets for the unauthenticated authentication client that sends the request message and redirect the request message to the authentication server; otherwise, to allocate a token from the shared token bucket to the Portal client that sends the request message and redirect the request message to the Portal server, and then to discard the request message if there is no token in the shared token bucket.

Second, the setting execution module 6011 shown in FIG. 6 can set one high priority token bucket and more than two low priority token buckets in each sub local area network token bucket, but no shared token bucket is set in the local area network token bucket. On this basis, the second allocating module 6023 shown in FIG. 6 is to determine the sub local area network token bucket corresponding to the sub local area network to which the Portal client that sends the request message belongs when the detecting execution module 6021 detects that the Portal client is not of a high priority, and then to search the determined sub local area network token bucket for the low priority token bucket corresponding to the level of the authentication client that sends the request message, and then to take the found low priority token bucket as the token bucket for allocating tokens, then to allocate a token to the Portal client sending the request message and redirect the request message to the Portal server; if there is no token in the token bucket for allocating tokens, to judge whether there is a token in other low priority token buckets whose level is lower than that of the found low priority token bucket, if yes, then to preempt one token from the other low priority token buckets for the unauthenticated authentication client that sends the request message and redirect the request message to the authentication server; otherwise, to discard the request message.

It can be seen that when the setting execution module 6011 sets more than two low priority token buckets in each of the sub local area network token buckets, it is allowed to preempt tokens for Portal clients corresponding to low priority token buckets of a certain level from low priority token buckets of a lower level in the same sub local area network token bucket.

Moreover, in order to make sure that not all the tokens in the low priority token buckets of a lower level are preempted, a token preempting threshold may be set, thus the second allocating module 6023 will be further to judge, when there is a token in the other low priority token buckets, whether the number of tokens preempted from the other low priority token buckets has reached the set threshold, and the operation of preempting a token from the other low priority token buckets can be continued only if the number does not reach the set threshold.

As described in more detail below, each of the above mentioned units or modules in FIGS. 5 and 6 may be implemented as machine readable instructions executable by one or more processors of the device. Alternatively, some or all of the units or modules may be implemented as one or more hardware modules comprising logic circuitry to perform the above described operations.

The examples and embodiments described above may be implemented by hardware, software or firmware or a combination thereof. For example the various methods, processes and functional units or modules described herein may be implemented by a processor (the term processor is to be interpreted broadly to include a CPU, processing unit, ASIC, logic unit, or programmable gate array etc.). The processes, methods and functional units may all be performed by a single processor or split between several processors. In a common implementation the units or modules may be implemented as machine readable instructions executable by one or more processors. Further the teachings herein may be implemented in the form of a software product. The computer software product is stored in a storage medium and comprises a plurality of instructions for making a computer device (which can be a personal computer, a server or a network device, etc.) implement the method recited in the examples of the present disclosure.

Those skilled in the art can understand that the modules or units in the apparatus in the examples can be arranged in the apparatus as described in the embodiment, or can be alternatively located in one or more apparatuses different from that, in the example. The modules in the aforesaid example can be combined into one module or further divided into a plurality of sub-modules.

Accompanying figures are only schematic diagrams of examples, the modules, units or process block in the figures are not indispensable.

Those skilled in the art may understand that the modules in the device in embodiment may be adaptively varied and disposed in one or more devices different from the embodiment. The modules or units in the embodiment may be combined into one module or unit, and further may be divided into multiple sub-modules or sub-units.

All of the features disclosed in this specification (including any accompanying claims, abstract and drawings), and/or all of the processes or units of any method or device so disclosed, may be combined in any combination, except combinations where at least some of such features and/or processes or units are mutually exclusive. Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed in one example only of a generic series of equivalent or similar features.

What is claimed is:

1. A method for controlling traffic of an authentication server, the method comprising:
   receiving a request message from an authentication client in a local area network, wherein the authentication client belongs to a sub local area network of the local area network;
   detecting, by a processor, a priority of the authentication client and determining a sub local area network token bucket corresponding to the sub local area network to which the authentication client belongs;

in response to the authentication client having a high priority, allocating a token from a high priority token bucket of the sub local area network and redirecting the request message to the authentication server;
in response to the authentication client having a low priority,
allocating a token from a low priority token bucket of the sub local area network if the token is available in the low priority token bucket and redirecting the request message to the authentication server;
in response to the token not being available in the low priority bucket, one of:
allocating a token from a shared token bucket of the local area network if the token is available in the shared token bucket and redirecting the request message to the authentication server, and
discarding the request message in response to a token not being available in the shared token bucket; and
recovering the allocated token after a successful authentication of the authentication client.

2. The method of claim 1, further comprising:
setting one high priority token bucket and more than two low priority token buckets in each sub local area network token bucket, wherein different low priority token buckets correspond to authentication clients that are to have different levels of low priorities in the sub local area network, and a sum of the numbers of tokens in the high priority token bucket and in all of the low priority token buckets is equal to the number of tokens in the sub local area network token bucket; and
wherein allocating a token from one of a low priority token bucket further comprises:
searching for a low priority token bucket that corresponds to the level of the authentication client; and
allocating a token from the corresponding low priority token bucket.

3. The method of claim 2, further comprising:
in response to the authentication client having a low priority and in response to the low priority token bucket not having an available token, determining whether there is a token in another low priority token bucket whose priority level is lower than a priority level of the low priority token bucket;
in response to finding a token in the another low priority bucket, preempting one token from the another low priority token bucket for the authentication client and redirecting the request message to the authentication server; and
in response to finding no token in the another low priority bucket, discarding the request message.

4. The method of claim 3, wherein when a token is available in the another low priority token bucket,
determining whether a number of tokens preempted from the another low priority token bucket has reached a set threshold;
discarding the request message in response to a determination that the set threshold has been reached; and
preempting one token from the another low priority token bucket in response to a determination that the set threshold not been reached.

5. The method of claim 1, wherein detecting the priority of the authentication client and determining the sub local area network token bucket corresponding to the sub local area network to which the authentication client belongs further comprise:
detecting the priority of the authentication client and determining the sub local area network token bucket to which the authentication client belongs according to an Internet Protocol (IP) address and configuration information of the authentication client; or
detecting the priority of the authentication client and determining the sub local area network token bucket to which the authentication client belongs according to a media access control (MAC) address and configuration information of the authentication client,
wherein the configuration information comprises:
an IP address network field corresponding to each of the sub local area networks and the corresponding priority of each IP address in each IP address network field when the authentication client is identified with the IP address; and
a corresponding MAC address network field of each of the sub local area networks and the corresponding priority of each MAC address in each MAC address network field when the authentication client is identified with the MAC address.

6. An authentication access apparatus, the authentication access apparatus comprising:
a processor; and
a memory on which stored machine readable instructions to cause the processor to:
receive a request message from an authentication client in a local area network, wherein the authentication client belongs to a sub local area network of the local area network;
detect a priority of the authentication client and determine a sub local area network token bucket corresponding to the sub local area network to which the authentication client belongs; and
in response to the authentication client having a high priority, allocate a token from a high priority token bucket of the sub local area network and redirect the request message to the authentication server;
in response to the authentication client having a low priority,
allocate a token from a low priority token bucket of the sub local area network if the token is available in the low priority token bucket and redirect the request message to the authentication server;
in response to the token not being available in the low priority bucket, one of:
allocate a token from a shared token bucket of the local area network if the token is available in the shared token bucket and redirect the request message to the authentication server, and
discard the request message in response to a token not being available in the shared token bucket; and
recover the allocated token after a successful authentication of the authentication client.

7. The apparatus of claim 6, wherein machine readable instructions are further to cause the processor to:
set one high priority token bucket and more than two low priority token buckets in each sub local area network token bucket, wherein different low priority token buckets correspond to authentication clients that are to have different levels of low priorities in the sub local area network, and a sum of the numbers of tokens in the high priority token bucket and in all of the low priority token buckets is equal to the number of tokens in the sub local area network token bucket; and
wherein, to allocate a token from one of a low priority token bucket, the machine readable instructions are further to cause the processor to:

search for a low priority token bucket that corresponds to the level of the authentication client; and allocate a token from the corresponding low priority token bucket.

8. The apparatus of claim 7, wherein the machine readable instructions are further to cause the processor to:

in response to the authentication client having a low priority and in response to the low priority token bucket not having an available token, determine whether there is a token in another low priority token bucket whose priority level is lower than a priority level of the low priority token bucket;

in response to a token being in the another low priority bucket, preempt one token from the another low priority token bucket for the authentication client and redirect the request message to the authentication server; and in response to finding no token in the another low priority bucket, discard the request message.

9. The apparatus of claim 8, wherein when a token is available in the another low priority token bucket, the machine readable instructions are further to cause the processor to:

determine whether a number of tokens preempted from the another low priority token bucket has reached a set threshold;

discard the request message in response to a determination that the set threshold has been reached; and preempt one token from the another low priority token bucket in response to a determination that the set threshold has not been reached.

10. The apparatus as claimed in claim 6, wherein the machine readable instructions are further to cause the processor to:

detect the priority of the authentication client and determine the sub local area network token bucket to which the authentication client belongs according to an Internet Protocol (IP) address and configuration information of the authentication client; or detect the priority of the authentication client and determine the sub local area network token bucket to which the authentication client belongs according to a media access control (MAC) address and configuration information of the authentication client, wherein the configuration information includes:

an IP address network field corresponding to each of the sub local area networks and the corresponding priority of each IP address in each IP address network field when the authentication client is identified with the IP address; and a corresponding MAC address network field of each of the sub local area networks and the corresponding priority of each MAC address in each MAC address network field when the authentication client is identified with the MAC address.

11. A non-transitory computer readable storage medium storing machine-readable instructions that when executed by a processor, cause the processor to:

receive a request message from an authentication client in a local area network, wherein the authentication client belongs to a sub local area network of the local area network;

detect a priority of the authentication client and determine a sub local area network token bucket corresponding to the sub local area network to which the authentication client belongs;

in response to the authentication client having a high priority, allocate a token from a high priority token bucket of the sub local area network and redirect the request message to the authentication server;

in response to the authentication client having a low priority, allocate a token from a low priority token bucket of the sub local area network if the token is available in the low priority token bucket and redirect the request message to the authentication server;

in response to the token not being available in the low priority bucket, one of:

allocate a token from a shared token bucket of the local area network if the token is available in the shared token bucket and redirect the request message to the authentication server, and discard the request message in response to a token not being available in the shared token bucket; and recover the allocated token after a successful authentication of the authentication client.

12. The non-transitory computer readable storage medium of claim 11, wherein the machine readable instructions are further to cause the processor to:

set one high priority token bucket and more than two low priority token buckets in each sub local area network token bucket, wherein different low priority token buckets correspond to authentication clients that are to have different levels of low priorities in the sub local area network, and a sum of the numbers of tokens in the high priority token bucket and in all of the low priority token buckets is equal to the number of tokens in the sub local area network token bucket; and wherein, to allocate a token from one of a low priority token bucket, the machine readable instructions are further to cause the processor to search for a low priority token bucket that corresponds to the level of the authentication client; and allocate a token from the corresponding low priority token bucket.

13. The non-transitory computer readable storage medium of claim 12, wherein the machine readable instructions are further to cause the processor to:

in response to the authentication client having a low priority and in response to the low priority token bucket not having an available token, determine whether there is a token in another low priority token bucket whose priority level is lower than a priority level of the low priority token bucket;

in response to finding a token in the another low priority bucket, preempt one token from the other low priority token bucket for the authentication client and redirect the request message to the authentication server; and in response to finding no token in the another low priority bucket, discard the request message.

14. The non-transitory computer readable storage medium of claim 13, wherein when a token is available in the another low priority token buckets, the machine readable instructions are further to cause the processor to:

determine whether the number of tokens preempted from the other low priority token buckets has reached a set threshold;

discard the request message in response to a determination that the set threshold has been reached; and preempt one token from the another low priority token bucket in response to a determination that the set threshold has not been reached.

15. The non-transitory computer readable storage medium of claim 11, wherein the machine readable instructions are further to cause the processor to:
- detect the priority of the authentication client and determine the sub local area network token bucket to which the authentication client belongs according to an Internet Protocol (IP) address and configuration information of the authentication client; or
- detect the priority of the authentication client and determine the sub local area network token bucket to which the authentication client belongs according to a media access control (MAC) address and configuration information of the authentication client, wherein the configuration information includes:
- an IP address network field corresponding to each of the sub local area networks and the corresponding priority of each IP address in each IP address network field when the authentication client is identified with the IP address; and
- a corresponding MAC address network field of each of the sub local area networks and the corresponding priority of each MAC address in each MAC address network field when the authentication client is identified with the MAC address.

* * * * *